(12) United States Patent
Sung et al.

(10) Patent No.: US 12,479,326 B2
(45) Date of Patent: Nov. 25, 2025

(54) DETECTION CIRCUITRY FOR CONTROL PILOT ABNORMALITY OF A DC CHARGING PILE

(71) Applicant: PHIHONG TECHNOLOGY CO., LTD., Taoyuan (TW)

(72) Inventors: Sheng-Wen Sung, Tainan (TW); Jian-Hsieng Lee, Tainan (TW); Chun-Chen Chen, Taoyuan (TW)

(73) Assignee: Zerova Technologies Taiwan Limited, Tainan (TW)

( * ) Notice: Subject to any disclaimer, the term of this patent is extended or adjusted under 35 U.S.C. 154(b) by 879 days.

(21) Appl. No.: 17/734,065

(22) Filed: May 1, 2022

(65) Prior Publication Data

US 2023/0322115 A1    Oct. 12, 2023

(30) Foreign Application Priority Data

Apr. 8, 2022  (TW) .................................. 111113499

(51) Int. Cl.
*B60L 53/66*  (2019.01)
*B60L 53/30*  (2019.01)
*H02J 7/00*  (2006.01)

(52) U.S. Cl.
CPC ............. *B60L 53/66* (2019.02); *B60L 53/305* (2019.02); *H02J 7/00716* (2020.01)

(58) Field of Classification Search
CPC .................................................... B60L 53/66
USPC ......................................................... 320/109
See application file for complete search history.

(56) References Cited

U.S. PATENT DOCUMENTS

| | | | | |
|---|---|---|---|---|
| 9,804,034 | B2* | 10/2017 | Jefferies | B60L 53/16 |
| 12,358,389 | B2* | 7/2025 | Yu | B60L 53/14 |
| 12,365,259 | B2* | 7/2025 | Niwa | B60L 53/66 |
| 2009/0102433 | A1* | 4/2009 | Kamaga | B60L 3/04 180/65.29 |
| 2010/0268406 | A1* | 10/2010 | Ito | B60L 3/0023 701/22 |
| 2016/0121736 | A1* | 5/2016 | Jefferies | B60L 53/66 320/109 |
| 2017/0334301 | A1* | 11/2017 | Wu | B60L 53/16 |
| 2019/0168619 | A1* | 6/2019 | Hooker | B60L 53/14 |
| 2022/0242264 | A1* | 8/2022 | Niwa | B60L 3/0046 |
| 2025/0189600 | A1* | 6/2025 | Jang | G01R 31/52 |

\* cited by examiner

*Primary Examiner* — Jerry D Robbins
(74) *Attorney, Agent, or Firm* — WPAT, PC

(57) ABSTRACT

A detection circuit for control pilot abnormality of a DC charging pile, which is electrically connected to a control pilot signal generating circuit and a control circuit, providing instant protection for the DC charging pile while control pilot (CP) abnormality been detected. The detection circuit includes a control pilot (CP) signal potential discrimination module, a charging-discharging module electrically connected to the CP signal potential discrimination module, and a controller protection triggering module electrically connected to the charging-discharging module, wherein the CP signal potential discrimination module justifies the voltage level of the input CP signals been input, activates the charging-discharging module to charge the CP signals to a steady-state voltage higher than a predetermined voltage level within a certain time period, and activates the controller protection trigger module to provide instant protection for the DC charging pile.

16 Claims, 6 Drawing Sheets

DETECTION CIRCUITRY FOR CONTROL PILOT ABNORMALITY OF A DC CHARGING PILE

CROSS-REFERENCE STATEMENT

The present application is based on, and claims priority from, Taiwan Patent Application Serial Number 111113499, filed Apr. 8 2022, the disclosures of which is hereby incorporated by reference herein in their entirety.

TECHNICAL FIELD

The present invention relates to DC charging of electric vehicles, and more particularly, a detection circuitry for control pilot abnormality of a DC charging pile.

BACKGROUND

In order to cope with the increasingly urgent problems of global warming caused environmental changes, the automobile industry has paid more and more attentions to the production of electric vehicles. With the increasing popularity of electric vehicles, their charging system has also drawn much attention than usual. As electric vehicles and charging pile systems become more diverse, interoperability between different components and consistency of charging standards will become more important. To confirm the source of interruption in the charging process and perform both reliability and robustness tests for various interferences, it is necessary to perform a consistency coverage test in an open test system. Matching issues existing between different charging components of many car manufacturers, the Charging Interface Initiative (CharINe. V.), as an open agreement of important global electric vehicle manufacturers, develops and establishes various electric vehicle charging standards to improve the convenience and efficiency of charging infrastructure. There are currently three types of charging agreement standards, each has charging interface, such as the use of Combined Charging System (CCS) in Europe and North America, GB/T27930 and GB/T18487 in China, and CHAdeMO in Japan.

Take the Combined Charging System (CCS) as an example, which only requires one charging interface on the vehicle, allowing customers to charge the vehicle using all existing charging methods: single-phase alternating current (AC) charging, fast three-phase AC charging, and direct current (DC) charging at home/Ultra-fast DC charging at a public charging station. Among them, the charging process in accordance with the IEC 61851 standard of the Combined Charging System (CCS) standard defines four charging modes for electric vehicles:

mode 1: single-phase power charging, with maximum current 16 A, no pilot signals been provided.
mode 2: single/three-phase power charging, with maximum current 32 A, and having pilot signals provided.
mode 3: single/three-phase power for charging, with maximum current 63 A, and having pilot signals provided by the charging pile.
mode 4: DC charging up to 400V/125 A.

Mode 1 does not involve the communication between the vehicle and the charging infrastructure, such as the charging station/pile, but in the charging modes 2, 3, and 4 which are based on the pulse width modulation (PWM) signal and performs the lower-layer communication through the CP (Control Pilot) connection. If the vehicle and the charging station support upper-layer communication at the same time, the signal must be modulated into a PWM signal according to the Home Plug GreenPHY standard, that is, Power Line Communication (PLC). In principle, all PLC-based charging communications require transmission via PWM. Therefore, a complete test system must be able to handle both communication modes.

This application aims to develop a detection technology of abnormal control pilots (Control Pilot, CP) when a charging interface of the combined charging system (CCS, Combined Charging System) is used. How to determine present status of the control pilot signals at the CP points at different timings, while a DC charging pile being used to charge an electric vehicle, in accordance with the CCS protocol is very important. For example, an approach can be applied to perform instant detection and protection when a short-circuit or an open-circuit happened at the CP point during charging. Conventionally, a DC charging pile is used to charge an electric vehicle in accordance with the CCS protocol, as the status of the CP point changes, a Modem installed on the DC charging pile detects and transmits the status of the CP point with its software. However, in some situations where the Modem's response time cannot catch up the reaction of the hardware of the DC charging pile, which may lead to errors, causing that the DC charging pile cannot be immediately protected. To prevent this from happening, in this application, a hardware is proposed to implement a control pilot (CP) status detection for protecting a DC charging pile when errors happen, such as a short circuit or an open circuit, at CP point. However, in practical applications, other specifications of DC charging piles can also be similarly improved according to the solution provided by the present invention, and are not limited to DC charging piles using the CCS protocol.

In general, the CP voltage detection system of the DC charging pile for electric vehicle is used to monitor the electrical connection status between the electric vehicle and the power supply equipment (DC charging pile) through electronic or mechanical means.

In addition, while the DC charging pile performs the charging procedure in accordance with the CCS protocol, when the state of the CP point changes, the time required for detecting and transmitting these changes with the corresponding software installed may not quick enough to catch up the hardware response, which may cause error conditions (such as a sudden short circuit or open circuit) to occur and is too late to protect the charging pile.

SUMMARY

Due to the aforementioned drawbacks, when the DC charging pile is certified by performing CE (CONFORMITE EUROPEENNE) procedure, according to the CCS Protocol, which requires the DC charging pile can immediately detect errors and execute protection while the CP point encounters problems, such as sudden short circuit or open circuit. To solve these issues, the present invention provides a detection circuitry for control pilot abnormality of a DC charging pile, which includes a control pilot (CP) signal potential discrimination module; a charging-discharging module electrically connected to the CP signal potential discrimination module; and a controller protection triggering module electrically connected to the charging-discharging module; wherein the CP signal potential discrimination module justifies voltage level of CP signals been input into the CP signal potential discrimination module, activates the charging-discharging module to charge the CP signals been output from the CP signal potential discrimination module to a steady-state voltage higher than a predetermined voltage level within a predetermined period of time, and then activates the controller protection triggering module to provide instant protection for the DC charging pile while an abnormal connection happened between the DC charging pile and an electric vehicle.

In one preferred embodiment, the CP signal potential discrimination module includes: a first voltage divider configured to generate two reference voltage levels, a first reference voltage level and a second reference voltage level, respectively; a first comparator; a second comparator; and a control pilot signal input terminal; wherein the first reference voltage level and the second reference voltage level are respectively input into an inverting input node of the first comparator and a non-inverting input node of the second comparator to act as potential references, the control pilot signal input terminal electrically connected to a non-inverting node of the first comparator and an inverting node of the second comparator for inputting the CP signals with negative portion of the CP signals been filtered out; wherein the first reference voltage level is higher than the second reference voltage level.

In one preferred embodiment, the charging-discharging module includes: a first charging-discharging circuit; and a second charging-discharging circuit; wherein the first charging-discharging circuit is electrically connected to output node of the first comparator and input node of the controller protection triggering module to charge the CP signals output from output node of the first comparator reaching to a first steady-state voltage within a first period of time, and provide fast charging and slow discharging characteristics for activating the controller protection triggering module to protect the DC charging pile; wherein the second charging-discharging circuit is electrically connected to output node of the second comparator and input node of the controller protection triggering module to charge the CP signals output from output node of the second comparator reaching to a second steady-state voltage within a second period of time, and provide fast charging characteristic for activating the controller protection triggering module to protect the DC charging pile; wherein the predetermined steady-state voltage is one of the first steady-state voltage or the second steady-state voltage, depending on whether the first charging-discharging circuit or the second charging-discharging circuit is activated.

In one preferred embodiment, the first charging-discharging circuit includes: a circuit formed by a first power source, a first resistor, a second resistor, a first diode connected in parallel with the second resistor, a first capacitor and ground; wherein one end of the first resistor is electrically connected to the first power source, other end of the first resistor is electrically connected to the output node of the first comparator, anode of the first diode electrically connected to the output node of the first comparator, cathode of the first diode electrically connected to one end of the first capacitor, and other end of the first capacitor is grounded.

In one preferred embodiment, the second charging-discharging circuit includes: a circuit formed by a second power source, a third resistor, a fourth resistor, a second capacitor and ground; wherein one end of the third resistor is electrically connected to the second power source, other end of the third resistor is electrically connected to the fourth resistor connected to the output node of the second comparator, a common node of the third resistor and the fourth resistor electrically connected to one end of the second capacitor, and other end of the second capacitor is grounded.

In one preferred embodiment, said controller protection triggering module includes: a second voltage divider configured to generate a third reference voltage level; a third comparator having an inverting input node coupled to said second voltage divider to input said third reference voltage level as potential reference, and a non-inverting input node coupled to said charging-discharging module to input said steady-state voltage for comparing with said third reference voltage level; when said steady-state voltage value is higher than said third reference voltage level, said third comparator outputs a high-level signal to said control circuit electrically connected to provide instant protection for said DC charging pile.

In one preferred embodiment, the control circuit is a digital processor circuit.

In one preferred embodiment, the control circuit controls a relay to disconnect electric connection between a DC power supply unit in the DC charging pile and a battery of the electric vehicle to provides instant protection for the DC charging pile.

BRIEF DESCRIPTION OF THE DRAWINGS

The components, characteristics and advantages of the present invention may be understood by the detailed descriptions of the preferred embodiments outlined in the specification and the drawings attached:

FIG. 2 (B) illustrates a diagram showing the relationship, under abnormal conditions (mitigation), between the voltage signal at the CP point and the change of the electrical connection states for the charging pile and the electric vehicle, when the DC charging pile is charging in accordance with the CCS protocol.

FIG. 3 (B) illustrates a detailed configuration diagram of a detection circuit provided in a DC charging pile according to a preferred embodiment of the present invention.

FIG. 3 (C) illustrates a generated charging and discharging curve by activating the first charging loop of the detection circuit when mitigation of the electrical connection (loose connection) between the DC charging pile and the electric vehicle is happened according to a preferred embodiment of the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In general, both Europe and North America adopt a combined charging system (CCS, Combined Charging System) charging interface, which has pins based on SAE J1772 standard and add two additional DC fast charging pins, and uses IEC 61581 as the global specification for the charging interface of electric vehicles. It regulates the basic cross-control pilot connection electrical signal standard between charging piles and on board charger (OBC) electronic devices of an electric vehicle. The above communication interaction is used to ensure the physical connection between the charging pile and electrical vehicle based on specific conditions, and to ensure the communication of power supply with chargeable capacity without safety concerns.

Figure 1A:
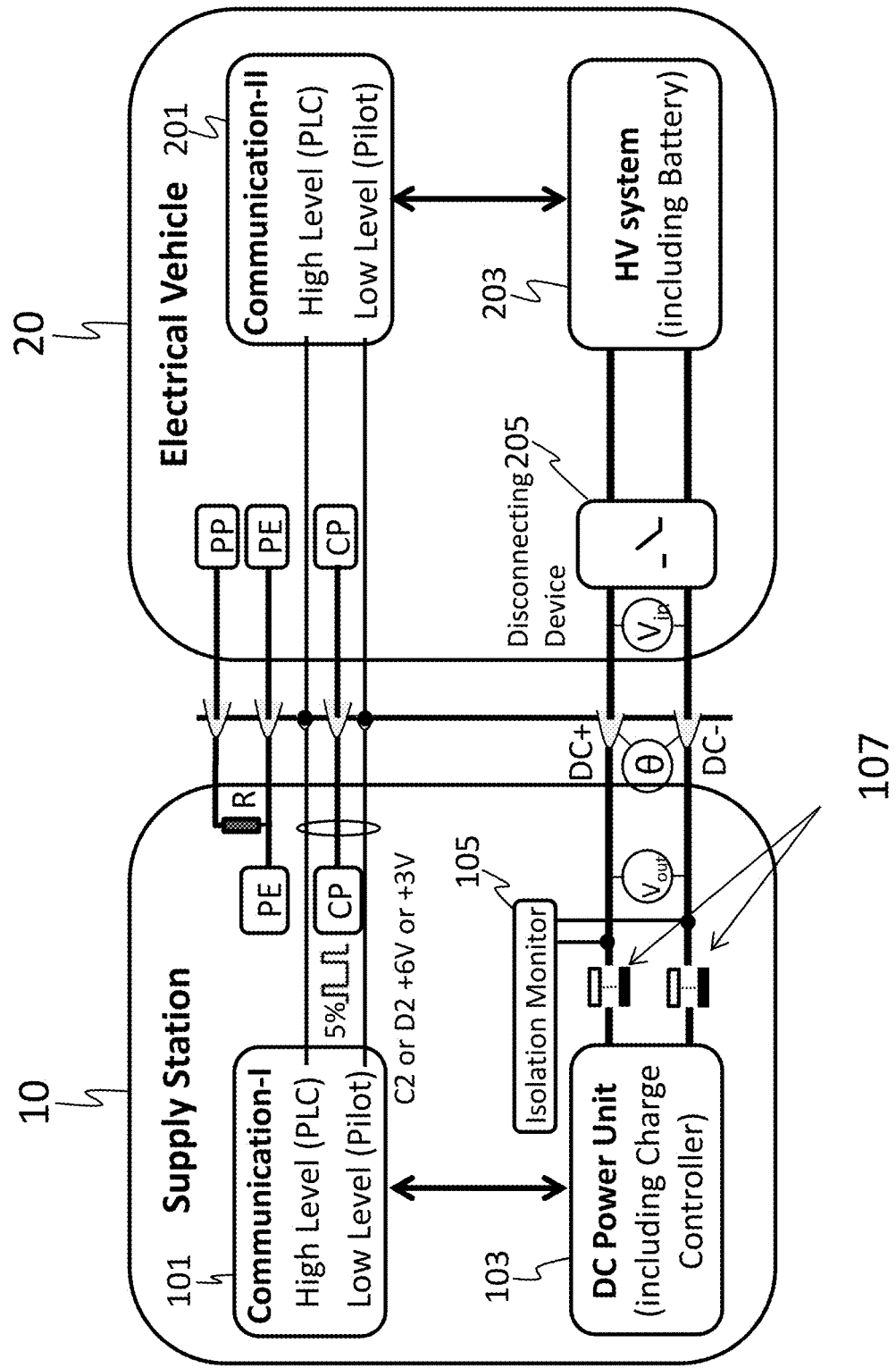
FIG. 1(A) illustrates a simplified system architecture of a DC charging pile for charging electric vehicles according to a prior art.

FIG. 1(A) depicts a simplified system architecture of a DC charging pile for charging electric vehicles. The DC charging pile 10 includes a first communication unit (Communication-I) 101, a DC power unit (including charge controller) 103, an isolation monitor 105, connection ports (PP, PE, CP, N, L1, DC+, and DC−), and a main switch/relay 107; the electric vehicle 20 includes a second communication unit (Communication-II) 201, a high voltage system (HV system, including battery) 203, a disconnecting device 205, and corresponding ports (PP, PE, CP, N, L1, DC+, DC−), where the power supply ports N and L1 are not shown in the figure.

The DC charging pile uses the Pulse Width Modulation (PWM) signals to justify the connection and power line supply statuses between the DC charging pile and the electric vehicle while charging. When the DC charging pile is charging according to the CCS protocol, the DC charging pile (supply station) 10 will generate a control pilot (CP) digital communication signal to start the charging sequence, signals at CP point will present different frequencies, duty cycles, and signal level differences according to various time sequences. Generally, a function or a test sequencing will be used in the DC charging pile 10 before charging processes started to enable test requests and check the order of required events/conditions, so that the electric vehicle 20 connected to the DC charging pile 10 will be sequentially tested and then charged. The test sequence is listed as follows: state A (the electric vehicle 20 is not connected to the DC charging pile 10), +12V; state B (the electric vehicle is connected to the charging pile, but not ready for charging), +9V; state C (the electric vehicle 20 is connected to DC charging pile 10, ready to be charged), +6V; state D (electric vehicle 20 is connected to the DC charging pile 10, ready to be charged, with ventilation requirements), +3V; and other states.

Please refer to FIG. 1 (B), which depicts a control pilot circuit showing that a DC charging pile charges an electric vehicle. In state A, the electric vehicle 20 has not yet been connected to the DC charging pile 10, while the switch S1 in the circuit of the DC charging pile 10 is connected to a +12V DC power. The detected voltage level at CP point is +12V (CP point is open). In state B, the electric vehicle 20 has been connected to the DC charging pile 10 but is not ready to be charged. At this moment, the oscillator generating circuit 121 in the DC charging pile 10 is connected to the switch S1, that is, to +12V (1 KHz, PWM signal), the switch S2 of control pilot circuit on the electric vehicle 20 side is opened. In this state, the voltage level of the CP point is +9V, which can be checked by analyzing the circuit loop formed by +12V (1 KHz, PWM signal), switch S1, resistor R1', CP, diode D, resistor R3', and PE. This loop forms a control pilot circuit, where the diode D, resistors R3' and R2', and PE forms a vehicle control circuit for confirming the compatibility between the DC charging pile 10 and electric vehicle 20. One example is that the DC charging pile 10 requires authorization (for example, from a RFID or a mobile phone) to allow charging started, but if such authorization has not been provided, the DC charging pile will not generate the oscillating control pilot signal. In state C, the DC charging pile 10 will be authorized to allow and enable charging. At this stage, the switch S1 of the control pilot circuit in the DC charging pile 10 is connected to the oscillator generating circuit 121 to generate oscillating control pilot signals (1 KHz+/−12V) and causes the switch S2 to be closed. By analyzing a loop formed by the control pilot signal (oscillating+/−12V), switch S1, resistor R1, CP, diode D, resistor R3'//R2' (// means parallel coupled), and PE, i.e. control pilot circuit, the voltage level at the CP point drops to +6V. In state D, the electric vehicle 20 is connected to a DC charging pile 10, ready to be charged, and when ventilation is required (usually in fast charge mode), the pilot signal (oscillating+/−12V), the control pilot circuit, which is formed by switch S1, resistor R1, CP, diode D, R3'//R2' (// means parallel coupled), and the PE, will coupled an additional 270Ω resistor in parallel, causing the voltage level at the CP point dropped to +3V.

Figure 1B:
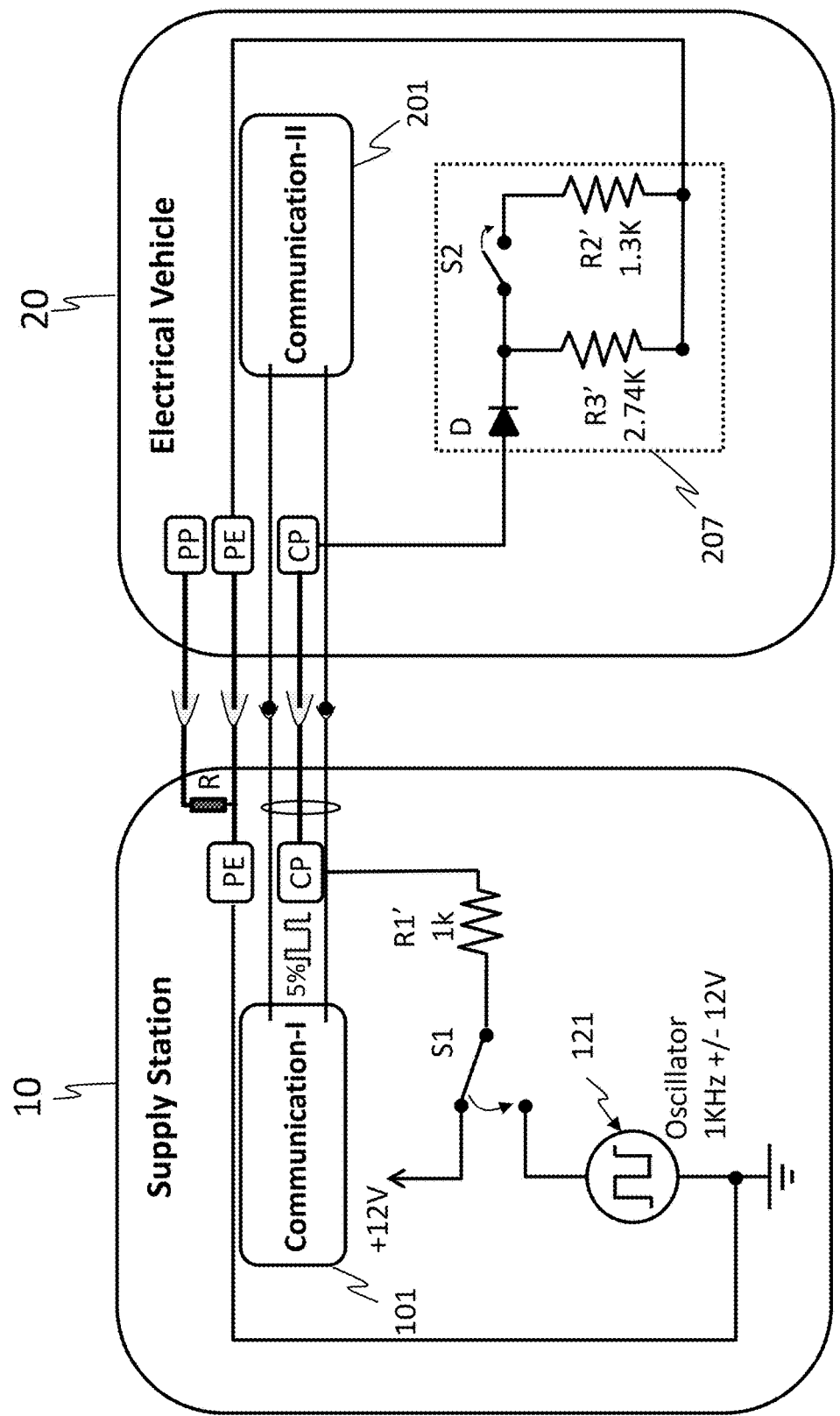
FIG. 1 (B) illustrates a control pilot circuit showing that a DC charging pile charges an electric vehicle according to a prior art.

Referring to FIGS. 1(A)-(B), after confirming that the DC charging pile 10 is connected to the electric vehicle 20, the PP port will be locked, enabling the charging ports of the electric vehicle 20 and their corresponding ports of the DC charging pile 10 been locked. The charging procedure according to the time sequence is as follows. Communication unit-I 101 on DC charging pile 10 and communication unit-II 201 on electric vehicle establish communications (PLC, CP communications) to communicate with each other for negotiating charging parameters and limitations, for example, when $V_{out}$>60V or incompatible conditions between the electric vehicle 20 and the DC charging pile 10 is detected, if any of these conditions happens, stop the charging process. When the electric vehicle 20 enters the state C/D from state B, at this moment, the DC charging pile 10 has entered the charging permission state. Isolation detection is performed on the high-voltage system 203 of the electric vehicle 20 and its isolation status is continuously reported. Once the DC charging pile 10 has successfully confirmed isolation and "approved", and then it responds with "Ready" to the communication unit-II 201 on the electric vehicle 20, and the charging circuit checking is then completed. Next, the electric vehicle 20 requests a pre-charging test, that is, the DC charging pile 10 is required to provide DC power with electric current less than 2 A. At this moment, the main switch/relay 107 on the DC charging pile 10 is closed. When $V_{out}$ is less than the allowable safety range, electric current is smaller than 2 A, and battery voltage at the electric vehicle 20 side is less than 20V, then the electric vehicle 20 closes the disconnection device 205, and allows charging (including fast charging) at the next stage. When a power down occurs, the electric vehicle 20 sends a request to the DC charging pile 10 for stopping the power output from the DC charging pile 10. After the electric current is less than 1 A, the electric vehicle opens the disconnection device 205, and then the DC charging pile opens the main switch/Relay 107.

Based on the prior arts described above, it is known that the CP signal actually plays a crucial role, it controls a series of tests and requests based on the orders of events/conditions that are required and must be satisfied in sequence, enabling the electric vehicles connected to the charging pile can be sequentially tested and start to be charged. As the CP signal directly plays an important role in the interpretation of the above-mentioned various conditions, it directly affects the overall performance and safety of the charging pile, therefore how to precisely detect the CP point voltage level is the most critical issue.

In addition, while the DC charging pile performs the charging procedure in accordance with the CCS protocol, when the state of the CP point changes, the time required for detecting and transmitting these changes with the corresponding software installed may not quick enough to catch up the hardware response, which may cause error conditions (such as a sudden short circuit or open circuit) to occur and is too late to protect the charging pile. In view of the above situation, the present invention designs a hardware circuitry to realize and protect control pilot abnormality of a DC charging pile.

Figure 2B:
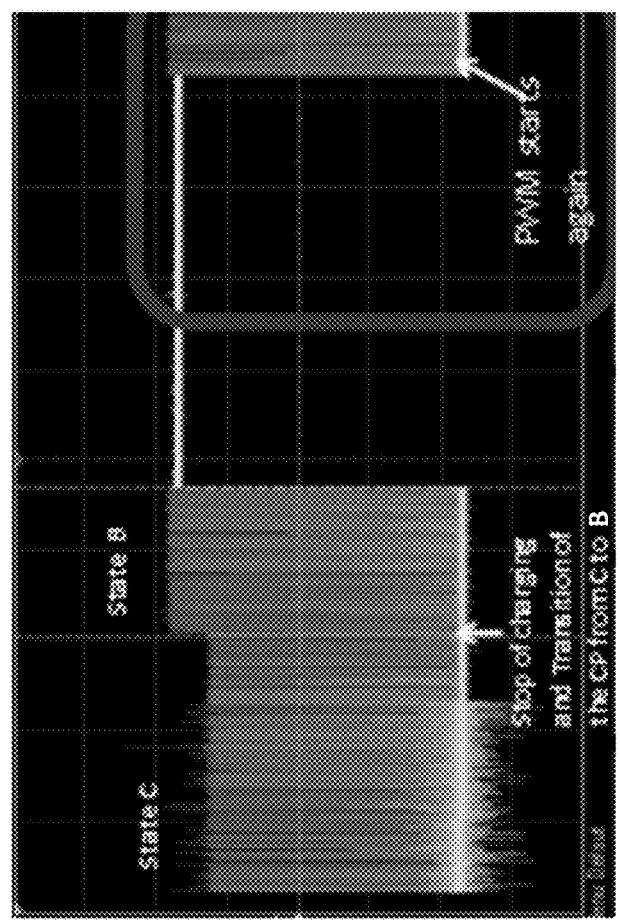
FIG. 2 (A) illustrates a diagram showing the relationship, under normal conditions, between the voltage signal at the CP point and the change of the electrical connection states for the charging pile and the electric vehicle, when the DC charging pile is charging in accordance with the CCS protocol.
Figure 2A:
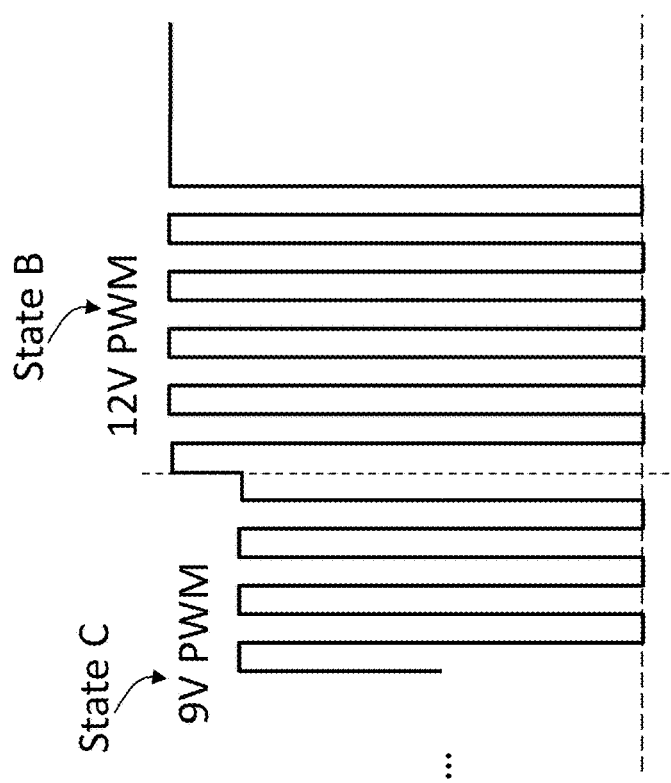

When the DC charging pile is charging in accordance with the CCS protocol procedure, under normal circumstances, as shown in FIG. 2(A), after the charging procedure is completed, the voltage signal at the CP point changes from State C to State B until the charging plug is moved by the electric vehicle. The voltage signal at the CP point will maintain a steady-state voltage of 12V when the charging plug is removed. As shown in FIG. 2(B), when the charging is completed, the voltage signal at the CP point changes from State C to State B, and the voltage signal at the CP point maintains a steady-state voltage of 12V for only a short period of time and then generates the PWM signals. However, this situation is abnormal and should not happen. When the situation as shown in FIG. 2(B) occurs, the CP point is in one of the abnormal conditions, that is, a sudden open circuit occurs in the charging connection. Another situation is that a sudden short circuit occurs in the charging connection, and the voltage signal at the CP point maintains a steady-state voltage of 0V. When any of the above abnormal condition occurs, it is a sudden and emergent situation, and a protection action for the DC charging pile needs to be completed within a time period defined by the relevant safety regulations.

At this moment, while the potential is changing, as indicated in FIG. 2(B) State B, the voltage signal at the CP point is within the PWM 5% duty cycle at the beginning, so it is necessary to develop a circuitry for real-time detection and protection for preventing hardware of the charging system, especially the charging pile and the battery of the electric vehicle, from being damaged caused by malfunctions.

The most important concern in developing this detection circuit is to focus on real-time detection and protection to prevent malfunctions from happening. Therefore, this circuitry must firstly be able to detect and justify current status of the CP point. For example, safety regulations of the charging pile stipulate that when the charging plug is mitigated (loosed connection), the charging current needs to be able to drop to less than 5 A within 30 ms and the charging voltage needs to be able to drop to less than 60V within 100 ms.

Figure 3A:
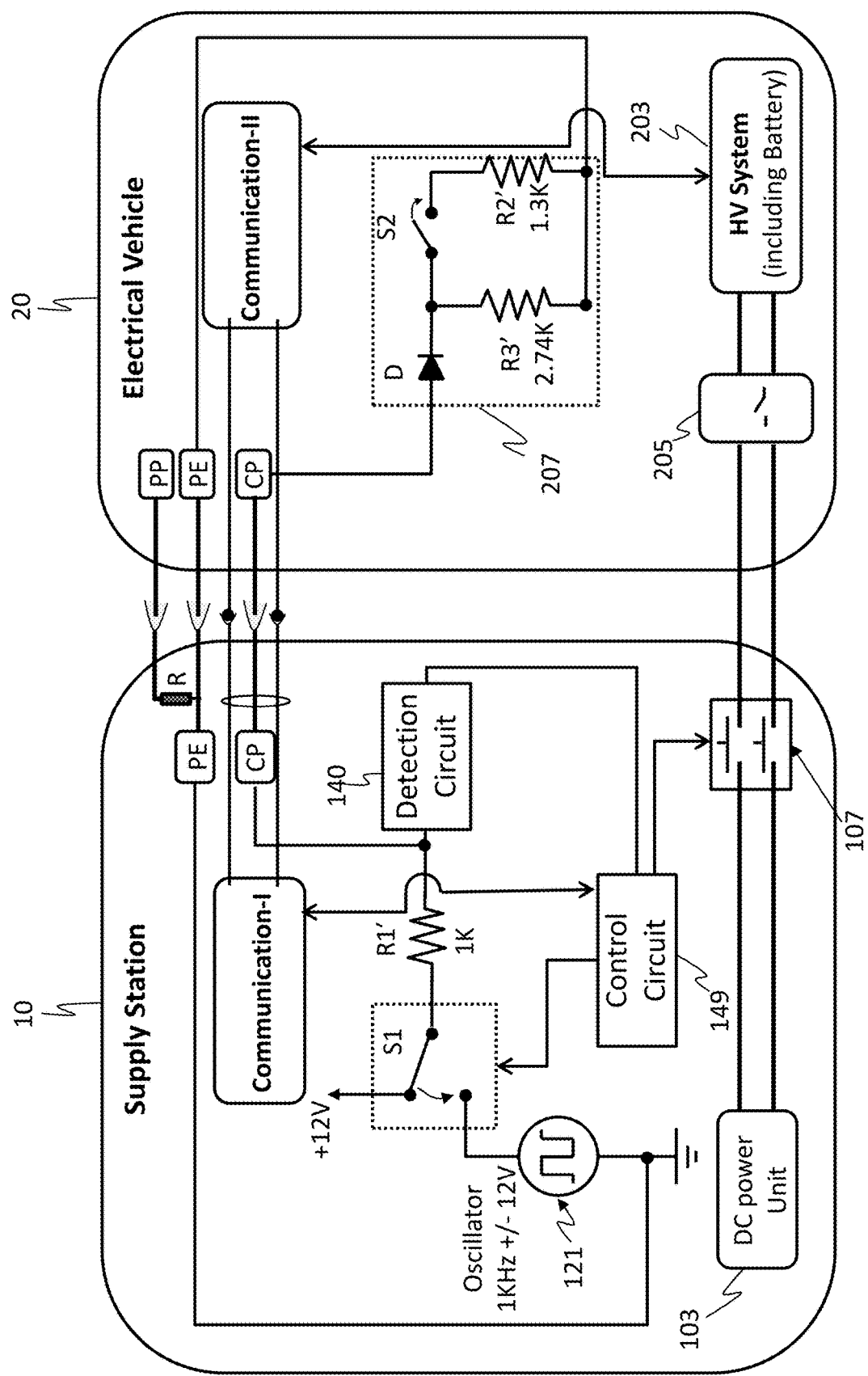
FIG. 3 (A) illustrates a schematic diagram of a detection circuit provided in a system architecture of a DC charging pile for charging an electric vehicle according to a preferred embodiment of the present invention.

The present invention provides a detection circuit 140 for detecting the voltage level of the CP point on the control pilot circuit, as depicted in FIG. 3(A), a detection circuit 140 is electrically coupled to the oscillator generating circuit 121 (act as a CP signal generating circuit) via a resistor R1' and switch S1 for providing detection of abnormal CP signals while the electrical vehicle 20 is connected to the DC charging pile 10, and outputs detected CP signals to a control circuit 149. The control circuit 149 can control the action of switch S1 and the main switch/relay 107 based on the received CP signals, and can communicate with communication unit-I (communication-I) 101 as well.

In one preferred embodiment, the aforementioned control circuit 149 is a digital signal processor integrated circuit (DSP IC), such as a microprocessor, a microcontroller unit (MCU), or other similar ICs.

Figure 3B:
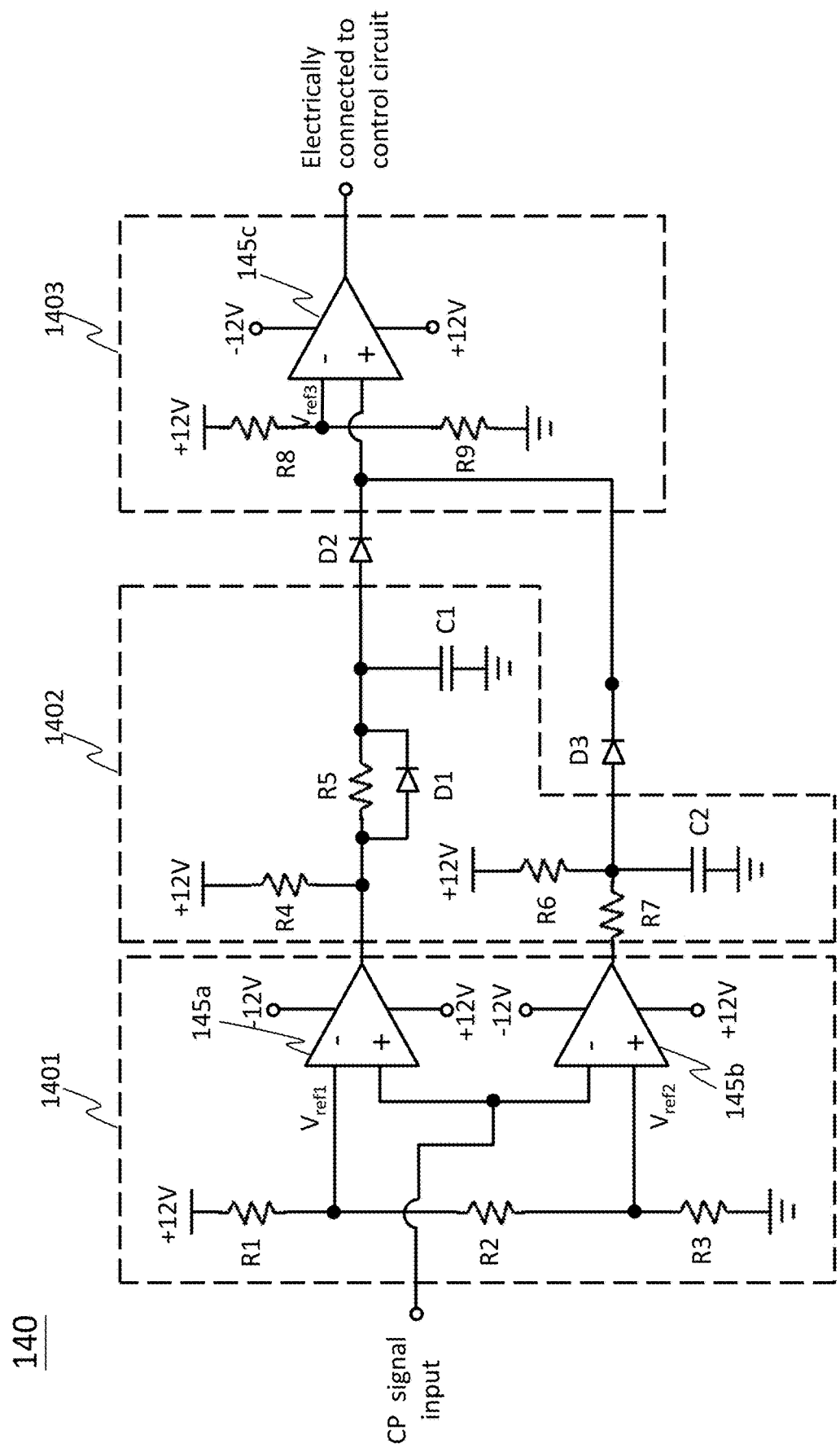

The implementation of the detection circuit 140 is utilizing an improved hardware circuitry to trigger the protection mechanism taking precedence the software detection when CP signal is abnormal, enabling that the protection mechanism can be actuated quickly enough to protect the overall charging system, i.e. charging pile. FIG. 3 (B) shows details of the circuitry, the detection circuit 140 includes a CP signal potential discrimination module 1401, a charging-discharging module 1402 and controller protection triggering module 1403. CP signal potential discrimination module 1401 includes a first voltage divider composed of a +12V voltage source, resistors R1, R2, R3 and ground for generating two reference voltage levels, that is, the first reference voltage level $V_{ref1}$ and the second reference voltage level $V_{ref2}$, where $V_{ref1}$ and $V_{ref2}$ are respectively fed into the inverting input node (−) of a first comparator 145a and the non-inverting node (+) of a second reference 145b to act as potential references, respectively, and a CP signal input terminal is branched to respectively connect to the non-inverting input node (+) of the first comparator 145a and the inverting input node (−) of the second comparator 145b for inputting CP signals been filtered out their negative portion. Charging-discharging module 1402 is composed of two charging-discharging circuit branches, namely a first charging-discharging circuit and a second charging-discharging circuit. The first charging-discharging circuit includes a +12V power supply (first power supply), a first resistor R4, a second resistor R5, a first diode D1 (R5//D1) connected in parallel with R5, a first capacitor C1 and ground to form a charging-discharging loop. One end of the first resistor R4 is electrically connected to the +12V, the other end of R4 is electrically connected to the output node of the first comparator 145a, and one end of R5//D1 (the anode end of D1) is electrically connected to output node of the first comparator 145a, the other end of R5//D1 (the cathode end of D1) is electrically connected to one end of the first capacitor C1, and the other end of the first capacitor C1 is grounded. The second charging-discharging circuit includes a +12V power supply (second power supply), a third resistor R6, a fourth resistor R7, a second capacitor C2 and ground to form another charging-discharging loop. One end of R6 is electrically connected to the +12V, and the other end of R6 is electrically connected to R7 which is electrically connected to the output node of the second comparator 145b. The common node of the resistors R6 and R7 is electrically connected to one end of C2, the other end of C2 is grounded. Controller protection triggering module 1403 is composed of a second voltage divider and a third comparator 145c, where the second voltage divider includes a +12V power supply, a resistor R8, a resistor R9 and ground for generating a third reference voltage level $V_{ref3}$ to act as potential reference, the third reference voltage level $V_{ref3}$ is fed into the inverting input node (−) of the third comparator 145c, and the non-inverting input node (+) of the third comparator 145c is electrically connected to the first charging-discharging circuit and the second charging-discharging circuit, via a second diode D2 and a third diode D3, respectively, for receiving the voltage signal output by the charging-discharging module 1402, and the output node of the third comparator 145c is electrically connected to the control circuit 149 (see FIG. 3 (A)) to control the action of the switch S1 and the main switch/relay 107 for providing instant protection to the charging pile and the battery of the electric vehicle. Arrangement of the above-mentioned second diode D2 and third diode D3 in the detection circuit 140 can prevent reverse backflow of the signal.

In an embodiment, the first reference voltage level $V_{ref1}$ is ranged from 0V to 11 V; the range of the second reference voltage level $V_{ref2}$ is ranged from 0V to 1 V; the third reference voltage level $V_{ref3}$ is ranged from 0V to 5 V.

When the CP signals (after rectification and filtering processes) are input to the detection circuit 140, the voltage level of the CP signals is justified by two (first, second) comparators (145a, 145b) in the CP signal potential discriminating module 1401, if the voltage level of the input CP signals is higher than $V_{ref1}$, the first comparator 145a outputs a high level signal to activate the first charging-discharging circuit, this situation corresponding to FIG. 2(B), an abnormal state occurs at the CP point, i.e., the charging connection is suddenly open and then returns to contact due to mitigation. Under this situation, the CP signals will recover from the +12V steady-state voltage to generate 12V PMW signals (due to the contact). When this situation occurs, the activated first charging-discharging circuit has the characteristics of fast charging and slow discharging due to which is at least composed of R5//D1 and a capacitor C1, so that the first charging-discharging circuit can be used to charge the CP signals output by the first comparator 145a to a first steady-state voltage value $V_{sat1}$ within a first period of time t1. The steady-state voltage value $V_{sat1}$ is then fed into the non-inverting input node (+) of the third comparator 145c of the controller protection triggering module 1403 through D2, and the voltage level of $V_{sat1}$ is higher than the voltage level of $V_{ref3}$, which enables the output node of the third comparator 145c outputting a high level signal to drive the control circuit 149 (see FIG. 3(A)) electrically connected to it, for disconnecting switch/relay 107 connected between the DC power supply unit 103 in the DC charging pile 10 and the main battery 203 in the electric vehicle 20 to provide them instant (real-time) protection.

In an embodiment, the first period of time t1 is less than 30 ms; the first steady-state voltage value $V_{sat1}$ is ranged from 0V to 9 V with optimized range between 6V to 9V.

Similarly, when the CP signals (after rectification and filtering processes) are input to the detection circuit 140, the voltage level of the CP signals is justified by two (first, second) comparators (145a, 145b) in the potential discriminating module of CP signal 1401, if the voltage level of the input CP signals is lower than $V_{ref2}$, the second comparator 145b outputs a high level signal to activate the second charging-discharging circuit, this corresponding to short circuit situation. Under this situation, the CP signals will maintain 0V steady-state voltage. When this situation occurs, the activated second charging-discharging circuit can charge the CP signals output by the second comparator 145b to a second steady-state voltage value $V_{sat2}$ within a second period of time t2. The second steady-state voltage value $V_{sat2}$ is then fed into the non-inverting input node (+) of the third comparator 145c of the controller protection triggering module 1403 through D3, and the voltage level of $V_{sat2}$ is higher than the voltage level of $V_{ref3}$, which enables the output node of the third comparator 145c outputting a high level signal to drive the control circuit 149 (see FIG. 3 (A)) electrically connected to it, for disconnecting switch/relay 107 connected between the DC power supply unit 103 in the DC charging pile 10 and the main battery 203 in the electric vehicle 20 to provide them instant (real-time) protection.

In an embodiment, the second period of time t2 is less than 9 ms; the second steady-state voltage value $V_{sat2}$ is 12V.

The above-mentioned CP signal potential discrimination module 1401 justifies the voltage level of the input CP signals to activate the charging-discharging module 1402, enabling it charges the CP signals, that are output from the CP signal potential discrimination module 1401, to a default steady-state voltage value within a predetermined period of time for activating the controller protection triggering module 1403, therefore provides immediate (real-time) protection to the DC charging pile. In a preferred embodiment, the predetermined steady-state voltage value is one of the first steady-state voltage value or the second steady-state voltage value, depending on whether the first or second charging-discharging circuit is activated.

When the CP signals (after rectification and filtering processes) are input to the detection circuit 140, the voltage level of the CP signals is passed through two (first, second) comparators (145a, 145b) in CP signal potential discrimination module 1401 and is justified, if the voltage level of the input CP signals is between $V_{ref1}$ and $V_{ref2}$, i.e., $V_{ref2}$<CP<$V_{ref1}$, both the first and second charging circuits in the charging and discharging module 1402 will not be activated (triggered), the main switch/relay 107 connecting the DC power supply unit 103 in the DC charging pile 10 and the battery 203 in the electric vehicle 20 maintains the previous state.

Figure 3C:
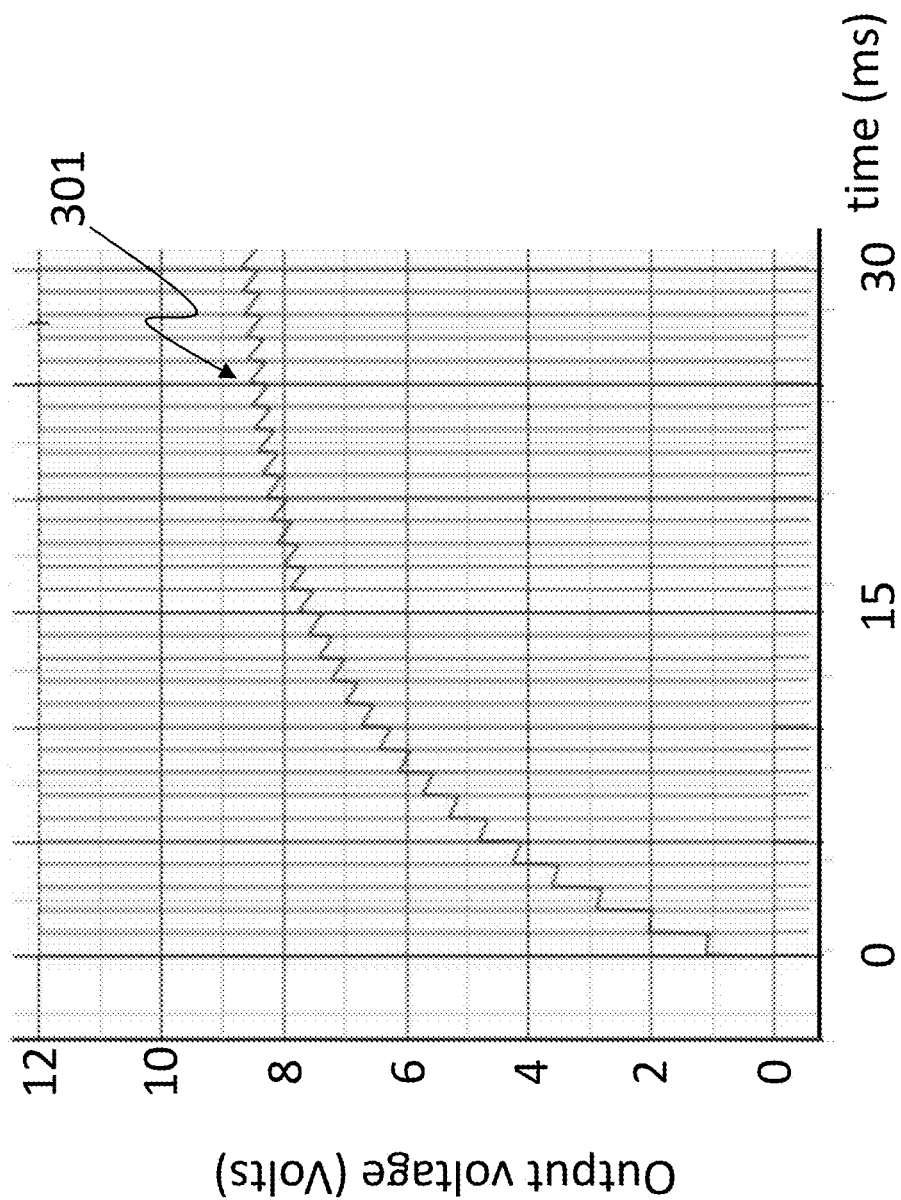

FIG. 3(C) depicts an actual measured charging-discharging curve. When the electrical connection between the DC charging pile and the electric vehicle is mitigated (loosed) and an abnormal CP PWM signal is generated, the first charging-discharging circuit in the charging and discharging module 1402 is activated by the CP signal potential discrimination module 1401 in the detection circuit 140, curve 301 is the charging-discharging curve as a function of time showing the output voltage of the first charging-discharging circuit with characteristics of fast charging and slow discharging during individual pulse of the CP PMW signal.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A detection circuit for control pilot abnormality of a DC charging pile, said detection circuit electrically connected to a control pilot signal generating circuit and a control circuit installed in said DC charging pile, said detection circuit comprising:
   a control pilot (CP) signal potential discrimination module;
   a charging-discharging module electrically connected to said CP signal potential discrimination module; and
   a controller protection triggering module electrically connected to said charging-discharging module;
     wherein said CP signal potential discrimination module justifies voltage level of CP signals been input into said CP signal potential discrimination module, activates said charging-discharging module to charge said CP signals been output from said CP signal potential discrimination module to a predetermined steady-state voltage higher than a preset voltage level within a predetermined period of time, and then activates said controller protection triggering module to provide instant protection for said DC charging pile while an abnormal connection happened between said DC charging pile and an electric vehicle.

2. The circuit of claim 1, wherein said CP signal potential discrimination module includes:
a first voltage divider configured to generate two reference voltage levels, a first reference voltage level and a second reference voltage level, respectively;
a first comparator;
a second comparator; and
a control pilot signal input terminal;
wherein said first reference voltage level and said second reference voltage level are respectively input into an inverting input node of said first comparator and a non-inverting input node of said second comparator to act as potential references, said control pilot signal input terminal electrically connected to a non-inverting node of said first comparator and an inverting node of said second comparator for inputting said CP signals with negative portion of said CP signals been filtered out;
wherein said first reference voltage level is higher than said second reference voltage level.

3. The circuit of claim 2, wherein said charging-discharging module includes:
a first charging-discharging circuit; and
a second charging-discharging circuit;
wherein said first charging-discharging circuit is electrically connected to output node of said first comparator and input node of said controller protection triggering module to charge said CP signals output from output node of said first comparator reaching to a first steady-state voltage within a first period of time, and provide fast charging and slow discharging characteristics for activating said controller protection triggering module to protect said DC charging pile;
wherein said second charging-discharging circuit is electrically connected to output node of said second comparator and input node of said controller protection triggering module to charge said CP signals output from output node of said second comparator reaching to a second steady-state voltage within a second period of time, and provide fast charging characteristic for activating said controller protection triggering module to protect said DC charging pile;
wherein said predetermined steady-state voltage value is one of said first steady-state voltage value or said second steady-state voltage value, depending on whether said first charging-discharging circuit or said second charging-discharging circuit is activated.

4. The circuit of claim 3, wherein said first charging-discharging circuit includes:
a circuit formed by a first power source, a first resistor, a second resistor, a first diode connected in parallel with said second resistor, a first capacitor and ground;
wherein one end of said first resistor is electrically connected to said first power source, other end of said first resistor is electrically connected to said output node of said first comparator, anode of said first diode electrically connected to said output node of said first comparator, cathode of said first diode electrically connected to one end of said first capacitor, and other end of said first capacitor is grounded.

5. The circuit of claim 3, wherein said second charging-discharging circuit includes:
a circuit formed by a second power source, a third resistor, a fourth resistor, a second capacitor and ground;
wherein one end of said third resistor is electrically connected to said second power source, other end of said third resistor is electrically connected to said fourth resistor connected to said output node of said second comparator, a common node of said third resistor and said fourth resistor electrically connected to one end of said second capacitor, and other end of said second capacitor is grounded.

6. The circuit of claim 3, wherein said first steady-state voltage value is ranged from 0V to 9V.

7. The circuit of claim 3, wherein said second steady-state voltage is 12V.

8. The circuit of claim 3, wherein said first period of time is less than 30 ms.

9. The circuit of claim 3, wherein said second period of time is less than 9 ms.

10. The circuit of claim 2, wherein said first reference voltage level is ranged from 0 to 11V; said second reference voltage level is ranged from 0 to 1V.

11. The circuit of claim 1, wherein said controller protection triggering module includes:
a second voltage divider configured to generate a third reference voltage level;
a third comparator having an inverting input node coupled to said second voltage divider to input said third reference voltage level as potential reference, and a non-inverting input node coupled to said charging-discharging module to input said predetermined steady-state voltage for comparing with said third reference voltage level;
when said predetermined steady-state voltage value is higher than said third reference voltage level, said third comparator outputs a high-level signal to said control circuit electrically connected to provide instant protection for said DC charging pile.

12. The circuit of claim 11, wherein said control circuit is a digital processor circuit.

13. The circuit of claim 12, wherein said control circuit comprises a microprocessor, a microcontroller unit (MCU) or other similar ICs.

14. The circuit of claim 12, wherein said control circuit controls a relay to disconnect electric connection between a DC power supply unit in said DC charging pile and a battery of said electric vehicle to provides instant protection for said DC charging pile.

15. The circuit of claim 11, wherein said third reference voltage level is ranged from 0 to 5V.

16. The circuit of claim 1, wherein said predetermined period of time is less than 30 ms.

* * * * *